Patented Apr. 10, 1951

2,548,159

UNITED STATES PATENT OFFICE 2,548,159

GROUP VIII SILICATE CATALYST ON NONSILICEOUS SUPPORT

Johannes Paulus Willem Houtman, Willem Frederik Engel, Han Hoog, and Peter van't Spijker, Amsterdam, Netherlands, assignors to Shell Development Company, San Francisco, Calif., a corporation of Delaware No Drawing. Application January 13, 1948, Serial No. 2,133. In the Netherlands January 17, 1947

11 Claims. (Cl. 252—455)

This invention relates to new and improved catalysts for the hydrogenation of oxides of carbon, to the prepartion of said improved catalysts, and to the hydrogenation of oxides of carbon with the aid of said catalysts. Particular aspects of the invention relate to the Fischer-Tropsch process, including in various modifications, for the synthesis of hydrocarbons and oxygenated products.

An object of the present invention is to improve various processes involving the hydrogenation of an oxide of carbon, such in particular as the Fischer-Tropsch process and its variants, through the use of an improved catalyst. An object is to provide highly active and long-lived catalysts prepared with other materials than kieselguhr, or with kieselguhr which would otherwise be considered unsuited. A further object is to provide highly active and long-lived catalyst in the form of pellets which have a greater mechanical strength than those prepared with selected kieselguhr. A still further object is to provide highly active and long-lived catalyst in the form of powder having better fluidizing properties than those prepared with kieselguhr. Still another object is to provide a highly active and long-lived catalyst which has better heat conducting properties than those prepared with kieselguhr. Yet another object is to provide highly active and long-lived catalysts which may be substantially free of alkali or magnesia.

The hydrogenation of oxides of carbon is an important reaction in a number of closely related processes, the most important of which is the Fischer-Tropsch process, minor variants of which are sometimes referred to in literature and for advertising purposes as the "Synthol process," "Synol process," "Synthine process," "Kogasin process," "Oxo process" and the "Methane process." By choosing suitable catalysts and operating conditions it is possible to synthesize products from methane up to high melting waxes and ranging in type from simple straight chain paraffins and olefins to highly complicated mixtures of alcohols, ketones and fatty acids. In these variations of the Fischer-Tropsch process a compound catalyst is used which contains as the main active ingredient one or more metals of the eighth group of the periodic system of the elements. Very little is known of the mechanism of the catalysis. Up until recently it was generally believed that carbides formed in the catalysts were the prime active constituents. (See The Petroleum Refiner, September, 1946, pages 423–425.) More recent studies indicate that carbide formation is merely incidental. The catalyst used commercially and the best catalyst so far developed has been a multi-component catalyst in which the metal of the eighth group is combined with a selected kieselguhr and small amounts of promoters. This is the "standard" catalyst. (See The Petroleum Refiner, September, 1946, page 426.) The kieselguhr not only serves as a carrier or support, but is also an important constituent of the compound catalyst. Although numerous other materials have been tried in place of kieselguhr and have been found to yield catalysts which are operative to some extent, the preparation of a truly active and long-lived catalyst has in the past not only required the use of a kieselguhr, but of a selected kieselguhr. It is necessary to select the kieselguhr by trial since most kieselguhrs produce only a very inferior catalyst. Prior to using it, the kieselguhr is calcined at 600–700 C. to reduce the volatile matter, including water, to less than 1%.

Using a suitable selected kieselguhr, an exact and minutely prescribed procedure has been developed by empirical methods for preparing the catalyst. (See the National Petroleum News, page R 922, 1945, and C. I. O. S. Black List Item 30.5.01.) This procedure was used in preparing the catalyst of Experiment I, described below. However, when preparing catalysts according to the present invention it is not necessary to follow this procedure in detail.

The catalysts described above and used commercially are the best of the type now available. They are quite active and have a satisfactory active life when used under proper conditions. In the light of modern advances, however, it is now apparent that it would be very desirable to improve these catalysts in certain respects. These catalysts, as now used, are used in the form of pellets placed in exceedingly narrow reaction zones bounded by large heat exchange surfaces (tube and plate reactors). In the processes in question the reaction is highly exothermic and a very uniform and controlled temperature is essential. The present kieselguhr base catalysts are very poor conductors of heat and this is a bottleneck, so to speak, in the processes in question. In attempts to improve the processes in this respect certain engineering variations have been tried on the pilot plant scale. In one of these, the so-called "Michael gas circulation method," the heat is carried out of the reactor with gas which is recirculated at a high velocity through an external cooler. It has not been possible to carry out this method successfully using the highly active kieselguhr type catalyst due to the fact that catalyst pellets made with kieselguhr have a relatively poor mechanical strength (about 2kg./pellet) and tend shortly to disintegrate when trying to operate at the high space velocities required.

Another engineering variation tried is the so-called "Duftschmidt" or "Winkler" method in which cooling is effected by cooling a recirculated stream of the liquid product. Using this method it is essential that the catalyst does not consist to any appreciable extent of kieselguhr since it has so far been impossible to press it into pieces having the mechanical strength required. Consequently in this method also, the highly active kieselguhr type catalyst cannot be used successfully and it has been necessary to resort to the use of hard pieces of sintered iron catalyst, which, while operative, is considerably less active.

The so-called "fluidized catalyst technique" recently developed and now widely applied for the catalytic cracking of hydrocarbons has also been tried on the pilot plant scale. However, due to the peculiar structure of kieselguhr the powdered catalyst made with kieselguhr is most difficult to fluidize and cannot be applied in the known manner without running into numerous difficulties. Because of the low heat conductivity of catalysts of this type and their very poor fluidizing properties all projected applications of the Fischer-Tropsch process (including its variations) using the fluidized catalyst technique are, as far as we are aware, based upon the use of a powdered sintered iron catalyst which is a less active catalyst of a totally different type. Thus this catalyst is usually prepared by mixing small amounts of promoters e. g. titanium oxide, potassium permanganate and sodium carbonate with iron powder (preferably from iron carbonyl), fusing the mixture in a stream of oxygen and crushing and reducing the fused cake at about 650° C. This catalyst requires the use of much higher temperatures and pressures of at least 20 atmospheres. It is substantially inactive at atmospheric pressure except for methane production.

We have examined the voluminous work on the development of the type of catalyst in question, have repeated some of it, and have continued the work with the object of improving these catalysts in one or more of the above-mentioned respects.

It has now been found that catalysts of the type in question, which are deficient due to having low activity and/or a short active life, can be materially improved in these respects by preparing them in such a manner that the active metal of group VIII is present to the desired extent in the form of a silicate. The addition of the silicate promoter does not afford any substantial improvement in activity and life in the case of catalysts prepared with a good selected kieselguhr since a catalyst prepared with a good, selected kieselguhr already has a high activity and a suitable active catalytic life. It does, however, make it possible to prepare excellent catalysts with diatomaceous earths which would heretofore be considered unsuited. More important, it makes possible the production of excellent and improved catalysts with a wide variety of other carrier materials. Thus, for example, various carrier materials can now be applied which are superior to the best kieselguhr in producing catalysts having improved mechanical strength and/or improved fluidizing characteristics and/or improved heat conducting properties, and without sacrificing the high activity and long catalytic life afforded by a good kieselguhr. The application of these catalysts in processes involving the hydrogenation of oxides of carbon allows substantial improvements to be realized.

An important feature of the catalysts of the present invention is that in their preparation a soluble silicate, e. g. sodium or potassium silicate, is added in limited amounts to precipitate a part of the metal of the eighth group as a metal silicate. The metal silicate is more difficult to reduce than the metal oxide or carbonate and remains largely as such during the subsequent reduction treatment; consequently the final catalyst contains part of the metal of the eighth group as finely divided reduced metal in intimate admixture with non-reduced metal silicate which acts as a promoter. A part of the metal of the eighth group may also be present as the unreduced parent compound other than the silicate e. g. the oxide and/or carbonate if the reduction is carried out under mild conditions, and, on the other hand, part of the metal silicate may be reduced if sufficiently severe reduction conditions are applied.

The production of the precipitated metal silicate and its incorporation in the catalyst may be effected in several ways. One suitable method is for example as follows: a solution of the metal, e. g. nickel nitrate, is prepared and the powdered carrier material, e. g. porous beta alumina, is slurried therein. A suitable amount of the soluble silicate, e. g. sodium or potassium silicate, is added to a solution of the alkali to be used, e. g. commercial soda containing sodium hydroxide and sodium carbonate in approximately equal amounts, and this mixture is then mixed with the slurry to cause the precipitation of the mixed silicate, hydroxide and carbonate of the metal. The carbonates, bicarbonates, hydroxides and silicates of sodium and potassium come mainly into consideration in practice although the corresponding compounds of the other alkali metals could be used. In making up the alkali solution the total amount of alkali required for the precipitation is first calculated and then the desired portion of the total alkali e. g. 3.5–43%, is substituted by the alkali silicate solution taking into consideration the ratio of alkali to silica in the alkali silicate used. It is convenient to first adjust the alkali in the silicate solution to give the meta silicate. When a sodium or potassium carbonate solution is used it is desirable to add the silicate solution thereto just prior to the precipitation in order to avoid flocculation of the silica. The alkali may be added to the slurry or the slurry may be added to the alkali solution, or the two liquids may be simultaneously pumped to a mixing and precipitation zone. While the carrier material is preferably slurried with the metal salt solution, it may, if desired, be slurried with the alkali solution. The carrier material may also, if desired, be added after the precipitation is partially completed or wholly completed by mixing it with the wet precipitate or by combining it with the precipitate after washing and drying, and in some cases this method gives superior catalysts.

In an alternative method the solutions of the metal salt and alkali are combined either in the presence or absence of the carrier material, the proportion of alkali being insufficient to precipitate all of the metal, and then a dilute solution of alkali silicate is added to complete the precipitation.

In another alternative the carrier is slurried with a solution of the alkali silicate. The solution of the metal salt is then added causing precipitation of the metal silicate. Finally the remaining portion of the metal salt is precipitated by the alkali, e. g. potassium or sodium carbonate.

The main active constituent of the catalysts in question is one or a mixture of metals of the eighth group of the periodic system of the elements. Generally the metal is cobalt or nickel. In some cases iron or ruthenium catalysts are preferred. Rhodium, palladium, osmium, iridium and platinum are operative and may be used, but these do not, as a rule, offer sufficient advantage to offset their greater cost. These metals may be used singly or in various mixtures. Thus, cobalt and nickel in about 1:1 ratio give a good catalyst for hydrocarbon synthesis.

The amount of the main active constituent varies with the metal used and in the case of a metal of the iron group is, in general, between about 10% and 60% based on the finished catalyst. In some cases, however, greater or lesser concentrations are suitable. In the case of nickel and cobalt catalysts for hydrocarbon synthesis about 30–45% of nickel or cobalt is usually about the optimum concentration. In the case of iron the concentration is often larger and in the case of the other metals of group VIII it is usually smaller. The remainder is largely relatively inert material and minor percentages of promoters.

The optimum amount of the metal which is present in the finished catalyst in the form of the silicate, may vary considerably depending upon the particular carrier material used, upon the amount of metal present, and upon the degree of the reduction of the metal. In some cases quite small amounts, e. g. 0.5%, gives a noticeable improvement; on the other hand excessive amounts, e. g. above about 60%, often decrease the overall activity of the catalyst. The optimum amount, in most cases examined, was between 5% and 50%. In making up a new catalyst about 20–40%, e. g. 30%, of the metal is advantageously introduced as the silicate; in subsequent preparations the percentage may then be increased or decreased if necessary to give the optimum results. Generally the active reduced metal is the same as the metal of the metal silicate. It is also possible, however, to employ different metals. Thus, for example, precipitated nickel silicate or cobalt silicate may be used to promote a cobalt-nickel catalyst, or a catalyst containing a different metal of group VIII, e. g. Ru. Copper or manganese can also be substituted for the metal of the eighth group in the silicate. These, of course, must be separately precipitated.

It is to be particularly pointed out that in order to obtain the desired promoting effect upon the life and activity of the catalyst obtainable through the proper incorporation of a suitable amount of the desired metal silicate, it is desirable that the metal silicate be in an active state in intimate mixture with the reduced metal serving as the main active constituent of the catalyst. By "active state" we mean that the metal silicate, e. g. nickel silicate, is in a form affording an appreciable available surface such as is the case with the various silicates produced by precipitation. Silicate added to the catalyst in other forms, e. g. alkali metal silicate, is not equivalent.

The metal silicate promoter in the present catalyst appears to have an individual or separate promoting action and can and usually will be used in conjunction with one or more of the conventional promoters applied in small amounts to control the properties of the catalyst with respect to quality of the product, etc. Various promoters which are applied singly or in combination in catalysts of the type in question for use in various processes involving the hydrogenation of oxides of carbon and which can be used in conjunction with the metal silicate promoters described are, for example, Mg, Th, Al, Zn, Cu, Na, K, Mn, Ce and U. Thus, for example, a small amount of Th, Mn, Ce, or U is sometimes added to regulate the paraffin production; Na, K, or Cu is sometimes used with iron catalysts. Na and K are believed to be effective in this catalyst through the formation of cubic $Fe_2O_3$ and the prevention of its transition into the less active magnetic $Fe_3O_4$, or through the formation of ferro magnetic alkali ferrite. Alkali is, however, harmful in the nickel and cobalt catalysts and is preferably absent. Thus in the nickel and/or cobalt catalyst of the invention, the concentration of alkali metal (calculated as the carbonate) is preferably below 2% based on the total weight of the catalyst. These promoters are present in the catalyst usually as the oxide or carbonate or in the reduced metallic state according to their ease of reduction and the extent to which reduction is carried out in preparing the catalyst. It is possible, however, that in some cases they may be present in part as precipitated silicates.

By promoting the active metal with the metal silicate as described it becomes possible to improve a deficient catalyst of the type prepared with any carrier. While it thus becomes possible to use any of the conventional carrier materials, it is nevertheless true that the carrier material should be chosen with regard to the operation contemplated. By the application of carrier materials having good conductivity it is possible to prepare excellent catalysts having a better heat conductivity than those prepared with kieselguhr. When control of the temperature is the main problem a carrier having good heat conductivity is preferably chosen. While any carrier material having a greater heat conductivity than kieselguhr will offer an improvement in this respect, mainly come into consideration various finely divided metals, such, for example, as powdered zinc, copper, nickel, iron, aluminum, brass, bronze, stainless steel and their alloys as well as such materials as silicon, silicon carbide, metal carbides and the like. Catalysts prepared with powdered metals, and particularly the more plastic metals, as the carrier, not only have a greater improved heat conductivity but also have a very high mechanical strength when produced in pilled form. Iron powder comes mainly into consideration as a carrier for an iron catalyst. It is to be pointed out that the metal powder used as a carrier, even if nickel or iron, for example, has substantially no catalytic effect in the desired conversion probably due to its low surface and inactive form. The catalytic action is practically confined to the extremely finely divided and promoted metal produced by reduction of the precipitated compound, e. g. oxy carbonate. It is, therefore, possible for example to have a catalyst consisting essentially of promoted iron in combination with a powdered iron carrier.

When the catalyst is to be used in a system employing the so-called fluidized catalyst technique, it is desirable to choose a carrier material having good fluidizing characteristics. This is not a very difficult problem since most of the known carrier materials fluidize quite readily when in a powdered state and are superior to kieselguhr in this respect. The few exceptions are mainly flaky materials, such as flaked aluminum, graphite and mica. Examples of suitable carrier materials are for example the oxides of Al, Zr, Si, Cr, Mg, Sr, Ba, Ti, V; various compounds such as calcium borate, calcium phosphate, aluminum phosphate, barium sulphate, aluminum floride, zinc chromite and bentonitic clays. Many of these carrier materials, especially when produced synthetically by precipitation, gellation and the like, are highly microporous and have a large available surface in the order of 200–600 m.$^2$/g. While such materials can be employed, it is found that superior catalysts generally result when a less porous carrier material affording a surface less than 200 m.$^2$/g. is used. In many cases such materials having a large available surface can be considerably improved as carrier materials by first treating them with steam for a time, e. g. at a temperature of 200-500° C. This results in an improved pore structure. Alpha alumina (the corundum form), for example, is a better carrier for the present catalyst than an active gamma alumina when combined in the wet way. The very fine alpha alumina bubbles used as a filler in the manufacture of rubber can, for example, be advantageously employed. When using this or other very light material it is possible to produce catalyst powders having a very low density. This is not usually considered desirable, but when operating with a fluidized catalyst it affords a distinct rather unexpected advantage. During use the catalyst gradually becomes contaminated with waxy deposits, and when employing a dense catalyst this causes a considerable decrease in the density of the particles. This in turn causes the catalyst particles to segregate or classify when used in a fluidized catalyst bed. By using a very light catalyst this difference in density is greatly minimized and segregating the catalyst can be avoided. Certain particularly excellent carrier materials for use in catalysts of the type in question have also been found. These are reaction products of gamma alumina with alkali metal oxides or alkaline earth metal oxides and are prepared by impregnating an active alumina with the desired metal oxide (or a compound yielding the oxide) and heating at temperatures sufficiently high to cause reaction but insufficiently high to destroy the porous structure of the active alumina. The reaction does not go to completion and the unreacted alkali is subsequently removed by leaching. When the material reacted with the alumina is an oxide of Na, K, Rb, Cs, Ca, Sr, or Ba, the product shows the diffraction pattern of a beta alumina. The product produced when the alumina is reacted with lithium oxide has a different diffraction pattern than gamma alumina or alpha alumina and appears to be a compound of the formula $Li_2Al_2O_4$ having a spinel-like structure. The reaction products when reacting the alumina with beryllium oxide or magnesium oxide are spinels. These materials, and particularly the beta aluminas, have a very suitable pore structure and produce particularly excellent catalysts when used as the so-called carrier in the catalysts of the invention.

Other materials such as ground fire brick, coke, pumice, asbestos, and talc, may also, if desired, be employed either alone or in combination with one of the above-mentioned carrier materials.

The following non-limiting experiments illustrate various aspects of the invention:

*Experiment I*

A promoted cobalt-kieselguhr catalyst was prepared by mixing 902.2 grams of cobalt nitrate solution containing about 120 grams cobalt with 12.6 grams of thorium nitrate (47.5% $ThO_2$) and 132 grams of magnesium nitrate solution (equivalent to about 12 grams of magnesium oxide) and diluting it with water to a volume of 3 liters. After heating substantially to boiling this solution was added within about one-half minute while stirring to 3 liters of a sodium carbonate solution containing about 104 grams $Na_2CO_3$ per liter which had also been heated to about 95° C. The mixture was stirred for about one-half minute and then 240 grams of kieselguhr was added. After stirring one minute the mixture was filtered and washed with 20 liters of distilled water at 95° C. to a final pH of 7.5.

The filter cake having a water content of about 70% was extruded through a die plate having holes 4 mm. in diameter and the extrudate was then dried for about one hour at 105° C. to a water content of about 6%. The dried extrudates were then broken into pellets about 5 mm. long and treated at 320° C. for 40 minutes with a stream of hydrogen having a linear velocity of 2.5 meters per second to reduce 60% of the cobalt present to the metallic state. This is the optimum degree of reduction for catalyst of this type. The bulk density of the catalyst was about 337 g./l.

This catalyst, prepared by the method recommended in the art and used commercially, was then employed for the synthesis of hydrocarbons by the hydrogenation of carbon monoxide. The synthesis was carried out under the following standardized test conditions:

Temperature, 185° C.
Pressure, 1 atm.
Ratio of hydrogen/CO in synthesis gas, 2:1.
Space velocity, 1 liter synthesis gas/hour/gram cobalt.

After a short induction period the contraction and yield of product ($C_3+$) were as follows:

| Hours | Per Cent Contraction | Yield, g./m.$^3$, Synthesis Gas |
|---|---|---|
| 24 | 51 | 73 |
| 48 | 36 | 47 |
| 72 | 34 | 37 |

It is seen that the catalyst not only shows a low activity, but has a very short active life. This kieselguhr would ordinarily be considered to be totally unsuited for use in preparing this type of catalyst. A catalyst prepared in the same manner using a good kieselguhr selected by trial gives, under the standard test conditions, a product yield over 100 g./m.$^3$ and has a much better active life.

*Experiment II*

A catalyst was prepared in the manner described in Experiment I using the same relative proportions and the same kieselguhr but in this case, according to the invention, the precipitation was carried out with a mixture of sodium carbonate and sodium silicate in which 10% of the total sodium was present as the silicate. The sodium silicate solution was added cold to the sodium carbonate solution which had previously been heated to 95° C., and the solution of the metal salts was then added immediately. After stirring for one minute the gieselguhr was added. The reduction was carried out in a similar manner, but in order to obtain the desired degree of reduction it was necessary in this case to reduce at 320° C. for one hour. About 58% of the cobalt was reduced to the metallic state. The bulk density of the catalyst was about 288 g./l.

This catalyst was employed for the synthesis of hydrocarbons under the standard conditions specified in Experiment I. The contraction and yield after a short induction period are shown in the following table:

| Hours | Per Cent Contraction | Yield, g./m.³, Synthesis Gas |
|---|---|---|
| 72 | 82 | 130 |
| 200 | 67.5 | 115 |

This experiment, taken with Experiment I, clearly illustrates the great improvement in catalytic life as well as activity that may be obtained by precipitating part of the cobalt as the silicate.

*Experiment III*

A promoted and supported cobalt catalyst was prepared using alpha alumina as the carrier in place of kieselguhr. The catalyst was prepared in the manner described in Experiment I using the same relative proportions of cobalt, magnesia and thoria. The proportion of alpha alumina to cobalt was however 875:100 parts by weight.

The alpha alumina was prepared by washing gamma alumina with 15% aqueous hydrochloric acid and finally with distilled water to remove any traces of sodium, and then heating at 1200° C. for 12 hours. The alpha alumina obtained was powdered and sieved through a 40–45 mesh sieve. The surface area of the alpha alumina was about 4.8 square meters per gram.

The catalyst was employed under the above-disclosed standard test conditions. The initial contraction after a twenty-hour induction period was 85% but dropped to less than 50% within 100 hours. After regeneration with hydrogen the maximum contraction was 80% and dropped to 30% in 100 hours. The yield of normally liquid products dropped from 70 to 56 grams per cubic meter of synthesis gas in the first 100-hour period and after regeneration to less than 40 grams per cubic meter of synthesis gas in the second 100 hours.

As would be expected the catalyst shows a very short active life and the alpha alumina would ordinarily be considered unsuited as a carrier material in this type of catalyst.

*Experiment IV*

A catalyst was prepared with the same alpha alumina according to the invention. The catalyst was prepared in the same manner and with the same proportion of material as in Experiment III, except that 10% of the sodium of the sodium carbonate required was replaced by sodium meta-silicate. This resulted in a catalyst in which about 14% of the cobalt was present as the silicate. The catalyst was finished and employed under the same conditions as in Experiment III.

The contraction was initially 85% and dropped over a period of 300 hours to about 78–79%. The yield of normally liquid products, even after 300 hours of operation without regeneration, was 110 grams per cubic meter of synthesis gas. This experiment taken with Experiment III illustrates the great improvement that may be obtained by precipitating part of the cobalt with the silicate in accordance with the invention.

*Experiment V*

A further catalyst was prepared as described in Experiments III and IV, except that 20% of the sodium of the sodium carbonate required was replaced by sodium meta-silicate. This resulted in a catalyst in which about 28% of the cobalt was present as the silicate. The catalyst was finished and employed under the same conditions.

After a small induction period the contraction was entirely constant at 83% for over 300 hours and the yield of normally liquid products was constantly maintained at 110 grams of cubic meter of synthesis gas.

This experiment, taken with Experiments III and IV, not only illustrates the great improvement which may be obtained, but also shows that alpha alumina is in fact a very suitable carrier material when the catalyst is promoted as described.

*Experiment VI*

A catalyst was prepared as described in Experiments III, IV and V, except that 30% of the sodium of the sodium carbonate required was replaced by sodium meta-silicate. This resulted in a catalyst in which about 42% of the cobalt was present as the silicate. The contraction was about 75% at the end of about 300 hours of use without regeneration and the production of normally liquid products was practically constant at about 100 grams per cubic meter of synthesis gas.

This catalyst contained somewhat more than the optimum concentration of cobalt silicate. The amount of cobalt silicate could be reduced by further reducing the catalyst. However a reduction temperature in the order of 450–500° C. is required to reduce the cobalt silicate and this would be detrimental to the activity of the catalyst for this reaction. Comparison of this experiment with Experiments III, IV and V, shows that the conversion, although much better than with the non-promoted catalyst, was somewhat less than the optimum.

In the above for the sake of comparison experiments were chosen in which the preparations were as similar as possible. As pointed out the method of preparation is susceptible to certain variations. The reduction of the catalyst, for example, may be carried out using other hydrogen-containing gases, e. g. a mixture of hydrogen and nitrogen. It is desirable, however, in order to obtain the maximum activity of the catalyst to use a hydrogen-containing gas which is as dry as possible and preferably is substantially free of carbon dioxide.

The catalysts of Experiments III to VI could be easily fluidized in the powdered form.

The relatively small amounts of oxygenated products produced in these experiments were not further investigated.

*Experiment VII*

A similar promoted cobalt catalyst was prepared by the same general procedure whereby part of the cobalt was precipitated as the silicate. A porous beta alumina was, however, substituted for kieselguhr. A small amount of graphite was added prior to pelleting. In the standard test the activity was high and sustained, 120 grams of C₃+ product being obtained per cubic meter of synthesis gas after 200 hours of operation.

The beta alumina was prepared by impregnating an active gamma alumina with caustic soda and heating the mixture at 1000° C. for a time to react about 50% of the alkali. The remaining unreacted alkali was then leached out.

Experiment VIII

A similar promoted catalyst was prepared in which aluminum powder was substituted for kieselguhr. In this case the precipitation was carried out with the mixed sodium carbonate and sodium silicate solution in the described manner, but the carrier material was not added until after filtering, washing and drying. A small amount of graphite was added prior to pelleting. In the standard test the activity was very high and sustained, 120 grams of C₃+ product being obtained per cubic meter of synthesis gas.

This method of incorporating the carrier material is preferred with some carrier materials and particularly those like activated gamma alumina, magnesium oxide and magnesium silicate, which have a large available surface and/or tend to react when combined in the wet way.

Experiment IX

A promoted cobalt catalyst was prepared as described using activated gamma alumina as the carrier. When the powdered alumina was incorporated in the dry way the contraction was 70% and the yield was 80 g./m.² during 300 hours of use. When the active gamma alumina was incorporated in the wet way much less favorable results were obtained.

Experiment X

When magnesium oxide was applied as the carrier and was incorporated in the dry way a contraction of 72% was obtained after 1000 hours of use. When the magnesium oxide was incorporated in the wet way only a very inferior catalyst resulted.

Similar differences were found when incorporating hydrous magnesium silicate as the carrier.

The results obtained using magnesium oxide and magnesium silicate carriers incorporated in the wet way are in keeping with the past experience. It is known that magnesium oxide incorporated in the catalyst in the wet way has a certain detrimental effect. It has been considered desirable nevertheless to incorporate a regulated small amount of magnesium oxide in the usual kieselguhr base catalyst primarily to increase the strength of the catalyst pellets. Since the strength of the pellets is increased by the choice of a different carrier according to the invention, the magnesium oxide introduced in the wet way can be dispensed with.

It has also in some cases been attempted to increase the strength of the pellets of the conventional kieselguhr base catalysts by impregnating them with sodium silicate or with ethyl orthosilicate. This increases the strength somewhat but is detrimental to the activity of the catalyst. These expedients likewise become unnecessary when preparing catalysts according to the invention.

The usual commercial kieselguhr base catalyst has a pellet strength of about 2 kg. as measured in a Monsanto type tester. This tester measures the weight applied at the curved edge of the pellet to just cause fracture. However, by substituting various other carrier materials, silicate promoted catalysts with much improved pellet strengths have been obtained. Some of these are given in the following table:

| | Pellet strength kg./pellet |
|---|---|
| Activated gamma alumina | 8 |
| Activated bauxite | 6 |
| Magnesia | 12 |
| Magnesium silicate | 10 |
| Beta alumina | 12 |
| Aluminum | 25+ |

The pellets may be formed by die-pressing, casting, molding, or extrusion and may be formed in any desired size or shape. The increased strength of the pellets noted in the catalysts of the invention is due to the choice of the carrier and not to the silicate promoter. Thus, the catalysts of Experiments I and II had substantially the same low pellet strength. Also the catalysts of Experiments III to VI were substantially equivalent in mechanical strength.

Experiment XI

A supported nickel catalyst was prepared as follows: 87 cc. of a nickel nitrate solution having a concentration of 115 grams per liter and 15.8 cc. of a magnesium nitrate solution containing the equivalent 950 grams magnesium oxide per liter were mixed and diluted with distilled water to 125 cc. After heating to boiling a hot solution of 32 grams of sodium carbonate in 125 cc. of water was quickly added. Then 21 grams of alpha alumina powder, described above in Experiment IV, was added. After five minutes the slurry was filtered and the filter cake was washed for ten minutes with 12 liters of water. After extruding and drying at 110° C. the catalyst was reduced with hydrogen at 350° C. for two-and-a-half hours.

This catalyst was used for the hydrogenation of carbon monoxide in a lighting gas having the following composition:

| | Percent |
|---|---|
| $CO_2$ | 2.5 |
| $O_2$ | 1 |
| CO | 17 |
| $H_2$ | 63 |
| $CH_4$ | 9 |

$N_2$, balance.
S, less than 1 mg./m³.

When the gas was passed over the catalyst at a rate of 540 l./l./hr. at 230° C. no conversion occurred; at 234° C. the contraction amounted to about 12% and the final gas contained 12% CO and 15% $CH_4$.

In order to obtain a contraction of 60% giving a gas containing 1% CO and 76% $CH_4$, it was necessary to employ a temperature of 260° C.

Experiment XII

A catalyst was prepared as described in Experiment XI except that the precipitation was carried out with a solution of 7.4 grams sodium meta-silicate and 25.6 grams sodium carbonate in 125 cc. of water. To obviate flocculation the sodium silicate solution was added to the sodium carbonate solution just prior to the precipitation.

This catalyst was used for the methanization of the lighting gas described in Experiment XI using the same gas rate.

When the gas was passed over the catalyst at 185° C. no reaction took place; at 200° C., however, the hydrogenation was complete.

This experiment, taken with Experiment XI, shows the increased activity of the silicate promoted catalyst over the non-promoted catalyst. It is seen that with the promoted catalyst the conversion is complete substantially at the temperature at which the conversion is initiated.

Experiment XIII

A catalyst prepared as described in Experiment XI was used to hydrogenate the carbon monoxide in a gas mixture containing 0.5% $CO_2$, 10% CO and 87% $H_2$.

At a gas rate of 555 l./l./hr. and a temperature of 195° C. no reaction occurred; at a temperature of 210° C. the contraction was 6.8%; at a temperature of 226° C. the contraction was 33% and the final gas contained 0.5% CO and 19% $CH_4$.

With the catalyst of Experiment XII the contraction was 35% at a temperature of 200° C. and the final gas contained 0.3% CO, 18.5% $CH_4$.

When the gas rate was approximately doubled the first catalyst produced about 36% contraction at a temperature of 226° C. (final gas 0.4% CO and 19% $CH_4$), whereas the second catalyst gave a final gas of the same composition (35% contraction) at a temperature of 199° C.

The lower temperature which may be applied using the present promoted catalysts are of considerable technical advantage since they allow the reactors to be cooled with water at much lower pressures than those required when operating at higher temperatures.

In the preparation of the catalyst described in the above experiments the nitrates of Ni, Co, Th, and Mg were used. It is to be understood that other soluble salts such as the chlorides, sulfates, acetates, etc. can also be used. In the case of catalysts produced through the sulfate and promoted with thoria, it is desirable to precipitate the thoria separately from the nitrate and then combine the precipitated thoria with the washed precipitate produced from the sulfate solution. Also, as pointed out, any suitable precipitating agent may be applied in place of sodium carbonate. In some cases it is advantageous to have a small amount of ammonium hydroxide present during the precipitation.

Examples of other promoted catalyst combinations which may be prepared by the general methods described are the following:

Fe-Cu-$Na_2O$-iron silicate
Co-ZnO-cobalt silicate
Co-$Al_2O_3$-$ThO_2$-cobalt silicate
Ni-MnO-$ThO_2$-nickel silicate
Ni-MnO-$Al_2O_3$-nickel silicate
Co-MgO-$ThO_2$-nickel silicate
Ni-CeO-nickel silicate
Co-Cu-$ThO_2$-nickel silicate
Co-Ni-MnO-$UO_2$-nickel silicate
Fe-MgO-ZnO-iron silicate
Fe-Cu-Ni-nickel silicate
Fe-Cu-Ni-$CeO_2$-$ThO_2$-nickel silicate
Fe-$Na_2O$-copper silicate
Ni-$ThO_2$-cobalt silicate
Ru-nickel silicate
Ru-Cu-ruthenium silicate
Fe-$K_2O$-manganese silicate These are the active constitutents of the catalysts and may be applied to any of the abovementioned carried materials.

The present catalysts, like the unpromoted counterparts of the prior art, are subject to poisoning by certain poisons and to deactivation by overheating. They, therefore, require the same care against the inclusion of poisons and against sintering by overheating. They should not, in general, be subjected to a temperature above 500° C.

The various processes involving the hydrogenation of an oxide of carbon are carried out with the catalyst of the invention under the usual conditions applied with the previous unpromoted catalysts. In some cases the temperature may be in the order of 150° C. and in others it may be in the order of 300° C. Also the pressure may be atmospheric in some cases, and several hundred atmospheres in others, depending upon the product primarily desired. With nickel and/or cobalt catalysts in the Fischer-Tropsch synthesis of gasoline, temperatures in the order of 170-200° C. and pressures in the order of 1-10 atmospheres absolute are generally applied. With iron catalysts the temperatures and pressures are usually somewhat higher, for example, 225-270° C. and 10-30 atmospheres absolute. With ruthenium catalysts the pressure is even higher, for example 100 atmospheres. While the type of product depends to a large extent upon the particular catalyst and the composition of the reactant gases, it may be stated as a general rule that the hydrogenation of oxides of carbon produces primarily straight-chain hydrocarbons at relatively low temperatures, e. g. 150-300° C., whereas alcohols and other oxygenated products are favored at somewhat higher temperatures, e. g. 300-400° C. At still higher temperatures, e. g. 400°-475° C. isoparaffins may be formed and at still higher temperatures, e. g. 475-500° C. aromatic hydrocarbons may be produced. While the character of the product can be controlled to a large extent by choice of the catalyst, conditions and feed stocks, the products usually contain various amounts of hydrocarbons and oxygenated products including alcohols, aldehydes, ketones and acids. Thus, while the properties of the catalysts have been illustrated in the above in the production of methane and the synthesis of higher hydrocarbons these catalysts are equally suitable in the various modifications of the process wherein aldehydes, alcohols, ketones, ethers and/or fatty acids are important primary products. The cobalt catalysts, for example, are excellent for carrying out the so-called oxo process wherein carbon monoxide is hydrogenated in the presence of an added unsaturated hydrocarbon or derivative thereof.

The products obtained with the present promoted catalysts are the same in kind as those produced with the corresponding catalysts without the silicate promoter. There may however be a shift in the relative percentages of the products formed. Thus, the catalysts of the invention are particularly advantageous when carrying out the conversion to produce hydrocarbons of the gasoline boiling range. In this case, working at atmospheric pressure or a moderate pressure below about 5 atmospheres, the ratio of lower boiling hydrocarbons to higher boiling hydrocarbons produced is increased. If larger amounts of hydrocarbons boiling above the gasoline boiling range (205° C. E. P.) are desired the yield may be increased by operating at higher pressures.

The findings described above are not only of importance in providing a technical improvement in the synthesis of hydrocarbons and various oxygenated products through hydrogenation of oxides of carbons, but are also of interest from the theoretical point of view. There is some evidence that the unchallenged superiority of certain selected kieselguhrs as the so-called carrier for catalysts of this type is due in part to the fact that due to their origin by diatoms the silica of which they are almost entirely composed has a particular laminar structure not found in the usual carried materials. It is possible that the promoting effect of the present silicates of the metals of group VIII is due to the similarity of the structure to that obtained when using a selected kieselguhr. Nickel silicate promoter in the present catalyst, for example, has a similar plate-like structure. It might also be noted that the beta alumina also have a laminar structure. We have so far been unable to determine the structure of the other silicate promoters in the catalysts, probably because in their precipitated condition the particles are so small that the determination of the structure by X-ray is not possible. The function of the plate-like structure, if any, will be more clear when tests with other compounds of the element of group VIII, manganese and copper, e. g. certain aluminates, phosphates, borates, titanates, vanadates, stannates, chromites, arsenates, antimoniates, manganates, and rhenates, which have a laminar structure, are concluded.

We claim as our invention:

1. A hydrogenation catalyst consisting essentially of a relatively inert, silica-free aluminous support, a precipitated silicate of a metal of group VIII, and a metal of group VIII in intimate association therewith, the amount of metal of group VIII present as a silicate being about 0.5% and 60% of the total amount of said metal, the total amount of said metal being between about 10% and 60% on the finished catalyst.

2. A hydrogenation catalyst consisting essentially of a relatively inert, silica-free aluminous support selected from the class consisting of powdered aluminum and powdered alumina, a precipitated silicate of a metal of group VIII, and a metal of group VIII in intimate association therewith, the amount of metal of group VIII present as a silicate being between about 0.5% and 60% of the total amount of said metal, and the total amount of said metal being between about 10% and 60% on the finished catalyst.

3. A hydrogenation catalyst according to claim 1 in which the said metal of group VIII is cobalt.

4. A hydrogenation catalyst according to claim 1 in which the said metal of group VIII is nickel.

5. The process of the production of a supported type catalyst having as the primary active constituent a metal of group VIII, which comprises forming an aqueous solution of a salt of said metal, forming an aqueous solution of alkali carbonate and alkali silicate, the amount of alkali silicate being sufficient to combine with between about 0.5% and 60% of said metal, mixing the two solutions to thereby precipitate an intimate mixture of a hydrous oxycarbonate and silicate of said metal, washing and drying the precipitate, mixing the dried precipitate with relatively inert powdered material in an amount to reduce the concentration of said metal in the catalyst to between about 10% and 60%, pressing the resultant mixture into pellets, and partially reducing the said metal to the metallic state.

6. Process according to claim 5 in which the relatively inert support material is powdered aluminum.

7. Process according to claim 5 in which the relatively inert support material is magnesium silicate.

8. Process according to claim 5 in which the relatively inert support material is magnesia.

9. A hydrogenation catalyst consisting essentially of a relatively inert substantially silica-free catalyst carrier, a precipitated silicate of a metal of group VIII and a metal of group VIII in association therewith, the amount of metal of group VIII present as a silicate being between about 0.5% and 60% of the total amount of said metal, and the total amount of said metal being between about 10% and 60% on the finished catalyst.

10. A hydrogenation catalyst according to claim 9 in which the relatively inert substantially silica-free catalyst carrier consists essentially of alpha alumina.

11. A hydrogenation catalyst according to claim 9 in which the relatively inert substantially silica-free catalyst carrier consists essentially of a beta alumina.

JOHANNES PAULUS WILLEM HOUTMAN.
WILLEM FREDERIK ENGEL.
HAN HOOG.
PETER VAN'T SPIJKER.

REFERENCES CITED

The following references are of record in the file of this patent:

UNITED STATES PATENTS

| Number | Name | Date |
|---|---|---|
| 1,844,998 | Wietzel | Feb. 16, 1932 |
| 2,088,281 | Smith | July 27, 1937 |
| 2,261,184 | Roelen et al. | Nov. 4, 1941 |
| 2,339,927 | Heckel | Jan. 25, 1944 |
| 2,392,107 | Teter | Jan. 1, 1946 |
| 2,417,164 | Huber | Mar. 11, 1947 |
| 2,422,172 | Smith et al. | June 10, 1947 |